(12) United States Patent
Vandrilla

(10) Patent No.: US 8,340,997 B2
(45) Date of Patent: Dec. 25, 2012

(54) JUST-IN-TIME INSURER'S REMOVABLE GOODS EVALUATION AND REPLACEMENT SYSTEM

(76) Inventor: Steven J. Vandrilla, Oklahoma City, OK (US)

( * ) Notice: Subject to any disclaimer, the term of this patent is extended or adjusted under 35 U.S.C. 154(b) by 132 days.

(21) Appl. No.: 12/856,889

(22) Filed: Aug. 16, 2010

(65) Prior Publication Data

US 2011/0196706 A1  Aug. 11, 2011

Related U.S. Application Data

(63) Continuation-in-part of application No. 10/960,832, filed on Oct. 7, 2004, now Pat. No. 7,747,460.

(51) Int. Cl.
*G06F 17/60* (2006.01)

(52) U.S. Cl. ...................................... 705/7.11
(58) Field of Classification Search ............... 705/7.11
See application file for complete search history.

(56) References Cited

U.S. PATENT DOCUMENTS

| | | | | |
|---|---|---|---|---|
| 5,189,606 | A * | 2/1993 | Burns et al. ................. | 705/7.23 |
| 7,006,977 | B1 * | 2/2006 | Attra et al. .................. | 705/313 |
| 7,389,255 | B2 * | 6/2008 | Formisano .................. | 705/7.23 |

OTHER PUBLICATIONS

The Carpet and Rug Institute (CRI) (Carpet Specifications Guidelines), Dec. 2010, pp. 1-6.*

* cited by examiner

*Primary Examiner* — Romain Jeanty
(74) *Attorney, Agent, or Firm* — Dunlap Codding, P.C.

(57) ABSTRACT

The present invention is directed to a system, and method for making and using the same, for an on-site evaluation of removable goods, condition, and value, and further, for providing replacement removable goods. The present invention provides an effective and uniform way to more objectively evaluate removable goods and/or provide replacement removable goods and/or remediation of the removable goods to the benefit of both an insurer and a customer. More specifically, the present invention relates to a removable goods evaluation system which includes removable goods evaluators equipped with a portable apparatus for evaluating removable goods which includes an objective evaluation approach using evaluation logic to determine a current monetary market value, or "as new" or pre-use value, which takes into account removable goods characteristics, and/or a depreciated value which takes into account loss factors such as wear, appearance, and other degradative considerations. Further, the system of the present invention can include removable goods providers and/or remediators which participate in the remediation and/or replacement of a selected replacement removable goods. The present invention is directed to an interconnected system which includes estimation logic, project management logic and delivery logic for managing an insurance claim from start to finish in a just in time fashion.

4 Claims, 12 Drawing Sheets

| Please Enter Customer's Information | | |
|---|---|---|
| First Name [ ] | Last Name [ ] | |
| Street Address [ ] | | |
| City [ ] | State [ ] | Zip Code [ ] |
| Daytime Phone [ ] | Evening Phone [ ] | |
| Insurance Company [ ] | Policy Number [ ] | |
| Evaluator Name [ ] | Evaluator Company [ ] | |
| Comments [ ] | | |

[ Next ]  [ Cancel ]

| 1. Identify fiber type and enter number | |
|---|---|
| Premium Filament Nylon = 16   Olefin/nylon blend = 5<br>Filament Nylon = 13   Olefin/PP = 4<br>Staple Nylon = 10   Wool blend = 20<br>Polyester = 7   100% Wool = 30 | ☐ |

| 2. Pile, (height / twist / density), rate scale, enter number | |
|---|---|
| Low twist rate...<br>Low density   1/4"=3  3/8"=2  1/2"=1  3/4"=0  1"=0  1 1/4"=0<br>Med. density  1/4"=4  3/8"=3  1/2"=2  3/4"=1  1"=0  1 1/4"=0<br>High density   1/4"=5  3/8"=4    =3   3/4"=2  1"=1  1 1/4"=0<br>Medium twist rate...<br>Low density   1/4"=6  3/8"=5  1/2"=5  3/4"=4  1"=3  1 1/4"=2<br>Med. density  1/4"=7  3/8"=6  1/2"=6  3/4"=5  1"=4  1 1/4"=3<br>High density   1/4"=8  3/8"=7  1/2"=7  3/4"=6  1"=5  1 1/4"=4<br>High twist rate...<br>Low density   1/4"=7  3/8"=8  1/2"=8  3/4"=7  1"=6  1 1/4"=6<br>Med. density  1/4"=8  3/8"=9  1/2"=10 3/4"=11 1"=10 1 1/4"=9<br>High density   1/4"=11 3/8"=12 1/2"=13 3/4"=14 1"=15 1 1/4"=16 | ☐ |

| 3. Ounce weight per sq. yd. / tufted carpet | |
|---|---|
| Enter one half of sq. yd. Weight = sq. yd. Weight x 0.5 | ☐ |

| 4. Ounce weight per sq. yd. / woven | |
|---|---|
| Enter entire weight per sq. yd. = sq. yd. Weight x 1.0 | ☐ |

| 5. Tufted backing / enter number | |
|---|---|
| Polypropylene...<br>☐   open = 1         high pick = 3<br>☐   medium density = 2   special woven or soft = 4 | ☐ |

| 6. Style Elements choose only one and enter: | |
|---|---|
| Commodity / builder grade  -4     Cut and loop  +4<br>Saxony  +2     Berber loop Olefin  +1<br>Velvet  +4     Berber loop nylon  +4<br>Texture  +3     Sculptured Saxony  +2 | ☐ |

| 7. High style elements choose one and enter: | |
|---|---|
| Pattern cut pile add  5<br>Exotic blend of yarns or special treatments pile height < 3/4" = 5<br>pile height > 3/4" = 8 | ☐ |

*Fig. 10a*

| DEPRECIATED VALUE / SUBTRACT FOLLOWING ELEMENTS |
|---|
| 1. Enter loss by age<br>   1. Nylon / Enter the number of years old<br>   2. Polyester / Enter one and one half years old<br>   3. Wool / Enter half the number of years old<br>   4. Wool Blend / Enter three fourths of the number of years old<br>   5. Olefin and Olefin Blends / Enter one and one fourth of years old   ☐ |
| 2. Enter loss of twist number   ☐<br>   High = 6    Low = 2<br>   Medium = 4    None = 0 |
| 3. Enter loss of texture   ☐<br>   High = 6    Low = 2<br>   Medium = 4    None = 0 |
| 4. Enter stain level   ☐<br>   High = 6    Low = 2<br>   Medium = 4    None = 0 |
| 5. Enter fade level   ☐<br>   High = 6    Low = 2<br>   Medium = 4    None = 0 |

*Fig. 10b*

JUST-IN-TIME INSURER'S REMOVABLE GOODS EVALUATION AND REPLACEMENT SYSTEM

CROSS REFERENCE TO RELATED APPLICATIONS

This is a continuation-in-part of U.S. Ser. No. 10/960,832, filed Oct. 7, 2004 now U.S. Pat. No. 7,747,460, the entirety of which is hereby expressly incorporated herein by reference.

FIELD OF THE INVENTION

This invention relates generally to a system for evaluating and replacing removable goods, and more particularly but not by way of limitation, to a system for more objectively assigning an initial monetary market value and/or a devaluated monetary market value to removable goods in a timely and efficient manner.

BACKGROUND OF THE INVENTION

Removable goods are defined as goods which are not permanently fixed to a structure, for example, furniture, appliances, heirlooms, electronics, and the like. Each removable good in addition to the value of the structure and any permanent fixtures add to the insurable value of a customer's residence and/or business. Property insurers, such as insurance companies and other adjusting companies, have long dealt with problems associated with the valuation and/or replacement of damaged removable goods such as furniture or electronics in residential and commercial buildings of those they insure. A major expense is felt by both an insurer and a customer, or insured removable goods owner, due to time expended during both the evaluation of the claim and restitution of the damaged removable goods. Generally, insurer faces the cost of replacement or restoration of the damaged removable goods. Additionally, whether the building is a home or a business, the customer is inconvenienced until the replacement of the damaged removable goods are completed.

Presently, monetary value relationships for removable goods generally rely on a subjective valuation. For example, one method used by insurers is to agree in advance with the customer on a monetary worth for a specified removable good owned by the customer when an insurance policy or agreement is formed. One problem is that such a method can produce disparate results. If the removable good is overvalued, then the insurer pays more than the removable good is worth. If the removable good is undervalued, the customer will only receive the agreed upon amount and will often be dissatisfied, especially if prices of equivalent replacement removable goods have substantially increased above the agreed amount the customer will receive.

Another method often employed by insurers to determine the value of existing removable goods in order to settle damage claims is to require the customer to "get two quotes" from two independent retailers/appraisers which estimate the cost of replacement removable goods. Generally, one quote, or an average of both quotes, is used to determine the amount of monetary coverage that will be allotted to the customer by the insurer. Such a practice can result in fraud by the retailer to the detriment of the insurer, for example, when the retailer "buries" a deductible by adding extra cost so as to effectively pass the expense of the deductible to the insurer. Also, since the customer is responsible for the acquisition of the quotes, further delay and/or high-price quotes may result, further adding to the cost incurred by the insurer.

The current methods of assigning values of monetary worth to removable goods, such as for example those discussed above, which involve subjective methods and/or non-expert assessments, often result in unfair value assignments and dissatisfaction, or possibly even litigation, between the insurer and the customer. A major problem with current subjective and comparative methods is that such methods do not allow for an objective scientific evaluation to determine an initial monetary market value of the specified removable goods, i.e. a value of the specified removable goods in new, pre-use condition, or further, to determine a devaluated monetary market value, i.e. a value of the specified removable good taking into consideration the loss of value or depreciated value of the removable good caused by normal wear or abuse incurred during the life of the specified removable good. The determination of the devaluated monetary market value is especially beneficial, because when degradation due to such loss factors as aging, staining, wear, and tear of the specified removable good are not taken into account to devalue the specified removable good, the insurer may pay more than the realistic current worth of the specified removable good.

To Applicant's knowledge there is no interconnected system which includes estimation logic, project management logic and delivery logic for managing an insurance claim for removable goods from start to finish in a just in time fashion.

Thus, a need exists for a removable goods evaluation system which more objectively assigns monetary market value to removable goods, and more specifically, but not by way of limitation, which more objectively assigns an initial monetary market value and/or a devaluated monetary market value in a timely and efficient manner, so as to facilitate the providing of restitution to customers and to reduce costs of expenditures, inconvenience, and delays incurred by customers and/or insurers. It is to such a removable goods evaluation system that the present invention is directed.

BRIEF DESCRIPTION OF THE DRAWINGS

FIG. 2b shows the elements and the logic flow diagram for a furniture evaluator of the furniture evaluation system depicted in FIG. 2a.

FIG. 3 shows one embodiment of a program module for project information input.

FIG. 9 shows a report constructed in accordance with the present invention.

FIG. 10a is a chart for one embodiment of determining an initial monetary market value in accordance with the present invention.

FIG. 10b is a chart for one embodiment of determining a devaluated monetary market value in accordance with the present invention.

DETAILED DESCRIPTION OF THE INVENTION

Figure 1:
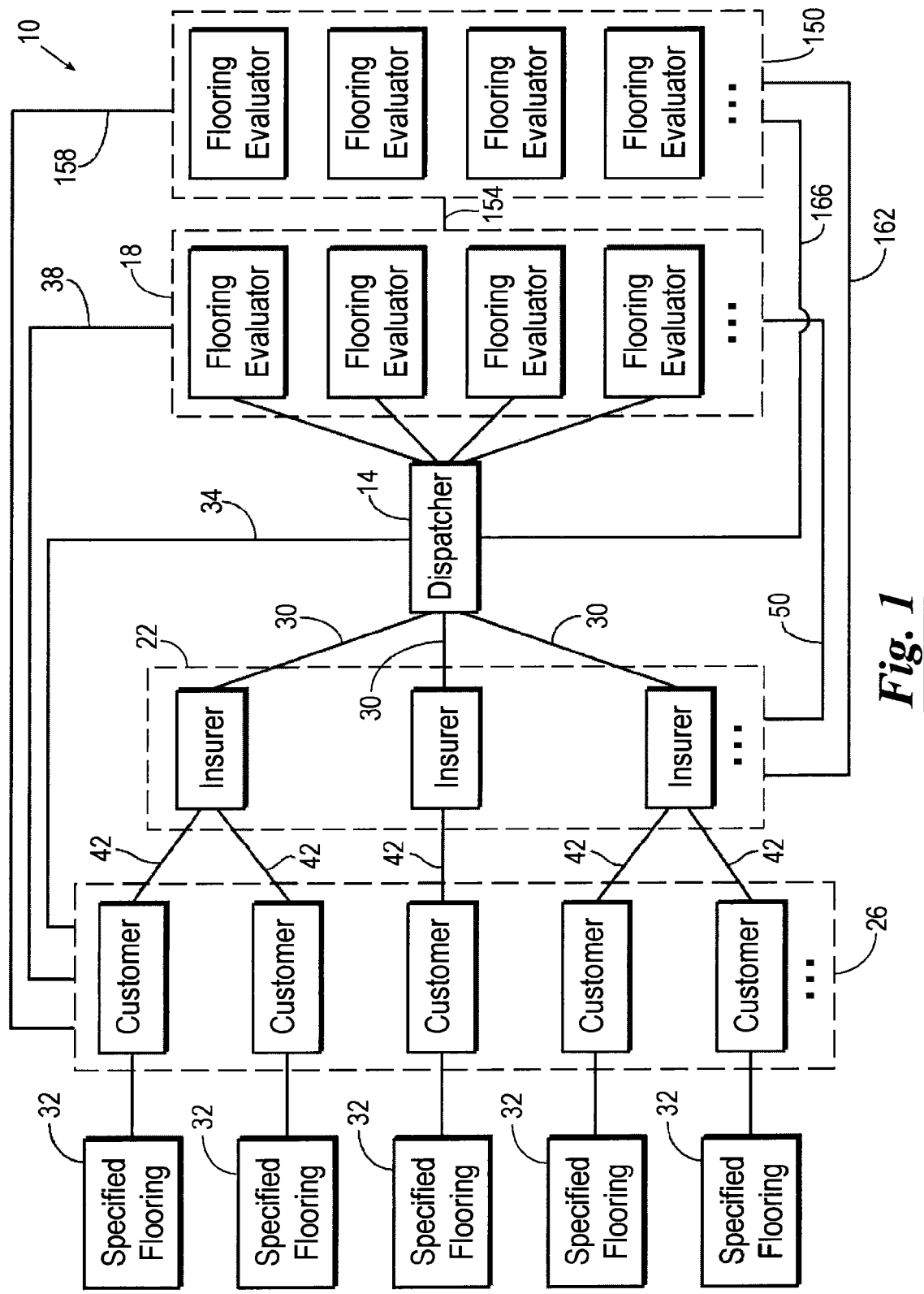
FIG. 1 is a diagram of a system for evaluating removable goods, including furniture, constructed in accordance with the present invention.

Referring now to the drawings and more particularly to FIG. 1, shown therein is one embodiment of a removable goods evaluation system 10. For purposes of brevity, the removable goods evaluation system 10 is disclosed for use in evaluating articles of furniture, which can include chairs, tables, sofas, coffee tables, armoires, desks, ottomans, recliners, bookcases, hutches, headboards, theater seats, cabinets and the like, although it will be understood that the removable goods evaluation system 10 may be utilized to evaluate other types of removable goods such as electronics, instruments, jewelry, heirlooms and the like.

The system 10 can be considered a just in time system for an insurer that can be used to take a furniture claim from a first notification of the insurer, to a project managing and reporting tool, to an estimating tool, to a product identifying module, to a value and pricing algorithm, to product selection, to direct search of retailer inventory, to ordering, to delivery and/or repair scheduling culminating with data input into a risk management tool—all following preset requirements of the particular insurer. The system 10 maintains digital records and preferably handles all legal paperwork including sign offs and notifications to the insured and delivers hard copies to the insured as well as sends all featured reports by satellite connection from a retail furniture site in a just in time fashion to the insurer. In one preferred embodiment all of the different features (including estimations, reports and risk management) of the system 10 are incorporated into a single software system such that when the insured stays within the predetermined confines of the insurance program, all legal and scheduling facets of the insurance program are able to be completed on the first appointment.

Generally, the system 10 includes a dispatcher 14, a plurality of furniture evaluators 18, a plurality of insurers 22, and a plurality of customers 26. In one preferred embodiment, when an article of furniture 32 of the customer 26 is damaged, the customer 26 will request a furniture evaluation of the article of furniture 32 so that the customer 26 can seek restitution from the insurer 22, e.g. through an agreement or insurance policy between the insurer 22 and customer 26. To facilitate the performance of the furniture evaluation, the request is received by the dispatcher 14, which selects one of the furniture evaluators 18 to perform the furniture evaluation at the site where the specified furniture 32 is located. Evaluation information determined from the furniture evaluation is then utilized in providing restitution to the customer 26. In one embodiment the evaluation information may include the original purchase receipt for the specified article of furniture 32. In another preferred embodiment, the evaluation information is utilized in conjunction with evaluation logic to determine, automatically, a current monetary market value, as well as a devaluated monetary market value, for the article of furniture 32. In an additional preferred embodiment, the furniture evaluator 18 can further cause the delivery of replacement furniture. The current monetary market value can be a retail price, a cost of manufacturing price, or a wholesale price. The evaluation logic can be run on a computer associated with a web site so that access to the evaluation logic is provided through the web site via a global network, such as the Internet. Alternatively, the evaluation logic can be implemented as a JAVA applet.

The dispatcher 14 can be any system, which may include an individual, corporation, and/or automated system, such as a computer system, which is capable of receiving and conveying information to a number of affiliated, independent and/or non-affiliated entities, including at least one furniture evaluator 18, insurer 22, and/or customer 26. The particular furniture evaluators 18, insurers 22, and/or customers 26 conveying and/or receiving information from the dispatcher 14 are not necessarily chosen by the dispatcher 14. For example, the dispatcher 14 can include a call center capable of receiving and conveying information via individuals, e.g. human personnel, and a telephone network, and/or the dispatcher 14 can include an Internet web site capable of conveying and receiving information via a public and/or global network, such as the World Wide Web.

The dispatcher 14 is capable of selectively receiving, and dispensing project information indicative of a request for performance of a furniture evaluation. The dispatcher 14 is also capable of receiving, and dispensing completed project information indicative of the performance of a furniture evaluation. In one preferred embodiment, the project information and/or the completed project information is also stored by the dispatcher 14.

The plurality of insurers 22 are shown in communication with the dispatcher 14 via a communication channel 30. The communication channel 30 may be any communication median capable of conveying and receiving information between the dispatcher 14 and the insurer 22, such as an analog or digital telephone line, cable, fiber-optic line, wireless or other electronic communication median, human median, and/or any newly developed communication median for communication between the dispatcher 14 and the insurer 22.

Generally, at least one of the plurality of insurers 22 receives a request for a furniture evaluation from at least one of the plurality of customers 26, generally from a customer 26 which has coverage by contract, such as an insurance policy, with the at least one insurer 22 whereby the at least one insurer 22 undertakes to indemnify, guarantee, or provide restitution to the customer 26 against loss by damage, or other incident defined by the contract, incurred by the article of furniture 32 owned by the customer 26. It should be noted that although the present invention is discussed herein as contemplating a furniture evaluation system where the customer 26 has a contractual relationship with at least one insurer 22, it should also be understood that the present invention also contemplates a system 10 where the customer 26 may request a furniture evaluation independent of a relationship with at least one insurer 22 (e.g. by communicating directly with the dispatcher 14 via a communication channel 34, and/or one of the furniture evaluators 18 via a communication channel 38).

For each customer 26, insurer 22, and article of furniture 32, the system 10 generally operates in the same manner, therefore, for purposes of clarity, the system 10 will generally be discussed hereafter with reference to one customer 26, one insurer 22, and one specified article of furniture 32, for example a chair.

Figure 2A:
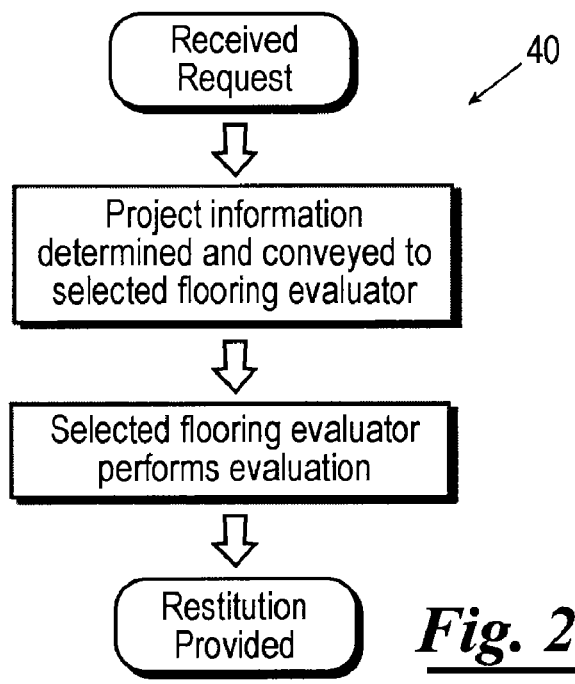
FIG. 2a shows the elements and the logic flow diagram for a furniture evaluation system.

Referring now to FIG. 2*a*, a logic flow diagram 40 for the furniture evaluation system 10 is shown. In general, when the performance of a furniture evaluation is requested, project information is determined. Project information can include information relating to the customer 26 for the specified article of furniture, the specified article of furniture 32, the insurer 22 for the specified article of furniture 32, insurance coverage provided by the insurer 22 for the specified article of furniture 32, or combinations thereof. For example, project information can include customer contact information (e.g. name, address, telephone numbers, email address, fax number, preference designations for contact method, location, and/or time for the customer 26). Further, project information can for example include furniture site information (e.g. address of building or structure containing the specified article of furniture 32), a general furniture description (e.g. type of furniture, dimensions, color), and a general damage description (e.g. type of damage, amount of damage, cause of damage, time of damage). Also, project information can include, for example, insurer contact information (e.g. company name, agent name, address, telephone numbers, email address, fax number, preference designations for contact method, location, and/or time for the insurer 22), and also insurance policy coverage details (e.g. deductible amount, maximum monetary restitution limitation, types of damages covered). Other information which can be included in the project information should be apparent to those of ordinary skill in the art.

Generally, the furniture evaluation is requested by the customer 26 and is received by the insurer 22 via a communication channel 42 (see FIG. 1). For example when the specified article of furniture 32 of the customer 26 is damaged and the customer 26 is seeking a claim for restitution for the damage, such as monetary compensation or replacement or restoration for the damaged specified article of furniture 32, the customer 26 contacts the insurer 22, for example, via telephone. Once the furniture evaluation request is conveyed, the insurer 22 receives and/or determines the project information and then conveys the project information to the dispatcher 14 via the communication channel 30. However, project information can also be received and/or determined by the dispatcher 14 directly from the customer 26. For example, project information can be conveyed by the customer 26 directly to the dispatcher 14 via the communication channel 34, or at least a portion of the project information can be conveyed to the dispatcher 14 by both the customer 26 and the insurer 22. Further, the dispatcher 14 may acquire at least a portion of the project information from previously received project information for a previously performed furniture evaluation for the customer 26 and/or insurer 22, for example, from a local database of the dispatcher 14.

The communication channel 34 and the communication channel 42 may be any communication median capable of conveying and receiving information between the customer 26 and the dispatcher 14 and between the customer 26 and the insurer 22, respectively, such as an analog or digital telephone line, cable, fiber-optic line, wireless or other electronic communication median, human median, and/or any newly developed communication median for communication between the customer 26 and the dispatcher 14 and between the customer 26 and the insurer 22, respectively.

Once the dispatcher 14 has received the project information, the dispatcher 14 utilizes the project information to select at least one furniture evaluator 18 to perform the furniture evaluation of the specified article of furniture 32. For example, the dispatcher 14 may maintain a database of information relating to the plurality of furniture evaluators 18, such as for example the location, appointment schedule, customer comments, insurer preference, furniture evaluations performed, and/or resources (e.g. manpower, equipment, available time, expertise) of each furniture evaluator 18, so that the dispatcher 14 can identify at least one appropriate furniture evaluator 18 to perform the requested furniture evaluation, from which at least one of the dispatcher 14, insurer 22, or customer 26 may select one furniture evaluator 18 to perform the furniture evaluation. The dispatcher 14 then conveys at least a portion of the project information to the selected furniture evaluator 18 via a communication channel 46.

In another example, the dispatcher 18 can convey at least a portion of the project information to one or more furniture evaluators 18 so that one of the furniture evaluators 18 can agree to perform the furniture evaluation, i.e. select itself to perform the furniture evaluation. For example, the dispatcher 14 can post on an Internet website a project listing representative of evaluation requests by the plurality of customers 26, wherein the project listing can also include at least a portion of the project information associated with each evaluation request so that at least one of the plurality of furniture evaluators 18 can review requested evaluations and determine if it has the resources (e.g. manpower, equipment, time, expertise) to perform at least one of the requested evaluations. One furniture evaluator 18 can then indicate a requested evaluation the furniture evaluator 18 agrees to perform, and further request any additional project information desired, and thereby select itself to perform the evaluation of a specified article furniture 32 or articles of furniture 32.

Although the present invention has been discussed herein above as the at least one furniture evaluator 18 receiving at least a portion of the project information from the dispatcher 14 via the communication channel 46, it should be understood that the present invention also contemplates the at least one furniture evaluator 18 receiving at least a portion of the project information from at least one of the dispatcher 14 via the communication channel 46, the insurer 22 via the communication channel 40, the customer 26 via the communication channel 38, or combinations thereof. The communication channel 46, the communication channel 50, and the communication channel 38 may be any communication median capable of conveying and receiving information between the dispatcher 14 and at least one of the furniture evaluators 18, between at least one of the insurers 22 and at least one of the furniture evaluators 18, and between at least one of the customer 26 and at least one of the furniture evaluators 18, respectively, such as an analog or digital telephone line, cable, fiber-optic line, wireless or other electronic communication medium, human medium, and/or any newly developed communication medium for communication between the dispatcher 14 and the furniture evaluators 18, between the insurers 22 and the furniture evaluators 18, and between the customers 26 and the furniture evaluators 18, respectively.

Further, although the present invention has been discussed herein as the dispatcher 14 selecting at least one furniture evaluator 18 (or allowing one furniture evaluator to select itself), the present invention also contemplates that at least one of the insurer 22 or customer 26 may select one of the furniture evaluators 18 to perform the furniture evaluation of the specified article of furniture 32, and provide at least a portion of the project information to the selected furniture evaluator 18, independent of the dispatcher 14. For example, at least one of the customer 26 or insurer 22 may convey at least a portion of the project information to a predetermined furniture evaluator 18, such as one named in the insurance policy by the insurer 22, or a furniture evaluator 18 may be selected by the customer 26 from a predetermined list of furniture evaluators 18 provided by the insurer 22. In another example, upon receiving the request for the furniture evaluation, the insurer 22 may receive and convey the project information to a furniture evaluator 18 selected by the insurer 22. In another example, the customer 26 can independently select one of the furniture evaluators 18, for example from a local telephone registry or advertisement, and convey the project information to the selected furniture evaluator 18.

Once one of the furniture evaluators 18 is selected to perform the furniture evaluation of the specified article of furniture 32 of the customer 26, and is provided with at least a portion of the project information, the dispatcher 14 can further convey to the insurer 22 via communication channel 30, or to the customer 26 via communication channel 34, furniture evaluator information which includes information indicative of the selected furniture evaluator 18 which will perform the furniture evaluation. The furniture evaluator information can include, for example, contact information (e.g. company name, employee name, address, telephone numbers, email address, fax number, and preference designations for contact method, location, and/or time for the furniture evaluator 18). Further, for the convenience of the customer 26, an appropriate time for the selected furniture evaluator 18 to perform the furniture evaluation of the specified article of furniture 32 can be coordinated and scheduled with the customer 26 by at least one of the insurer 22, the dispatcher 14, or the furniture evaluator 18.

Generally, evaluation information is information which relates to the furniture evaluation performed and may include information indicative of characteristics of furniture, loss factors of furniture, current monetary market value, devaluated monetary market value, or combinations thereof, associated with the evaluated furniture. Other information relating to the furniture evaluation which may also be included in the evaluation information should be apparent to those of ordinary skill in the art.

In one preferred embodiment, as discussed in further detail below, each furniture evaluator 18 is equipped with evaluation logic which receives input relating to the furniture evaluation and then utilizes such input to calculate, automatically, a value indicative of a monetary worth for at least a portion of the evaluated article of furniture or identify a replacement article of furniture from a predetermined catalog or listing of articles of furniture. In one embodiment, the evaluation logic calculates the monetary worth for at least a portion of the evaluated furniture in terms of a current monetary market value. The term "current monetary market value", as used herein, refers to a market worth of an article of furniture assuming the furniture is in new condition. In another embodiment, the evaluation logic calculates the monetary worth for at least a portion of the evaluated furniture in terms of a devaluated monetary market value. The term "devaluated monetary market value", as used herein, refers to a market worth of an article of furniture considering loss factors of furniture which cause degradation or deterioration in the furniture due to use during the life of the furniture. The devaluated monetary market value can be calculated using a current monetary market value determined utilizing the evaluation logic, or using a current monetary market value provided to the evaluation logic. Further, the evaluation logic can generate a report indicative of at least a portion of the input received, the calculated current monetary market value, and/ or the calculated devaluated monetary market value.

For each furniture evaluator 18 selected to perform a furniture evaluation, the furniture evaluation system 10 generally operates in the same manner, therefore, for purposes of clarity, the furniture evaluation system 10 will be discussed hereafter with reference to one furniture evaluator 18 which has been selected to evaluate the specified furniture 32.

Figure 2C:
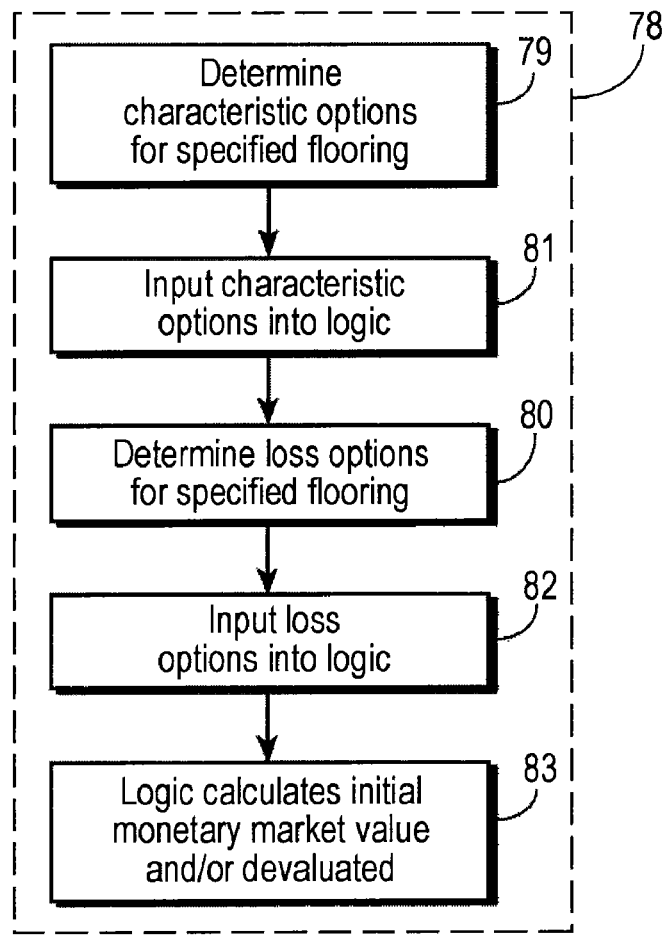
FIG. 2c shows the sub-elements for the logic flow diagram depicted in FIG. 2b.
Figure 2B:
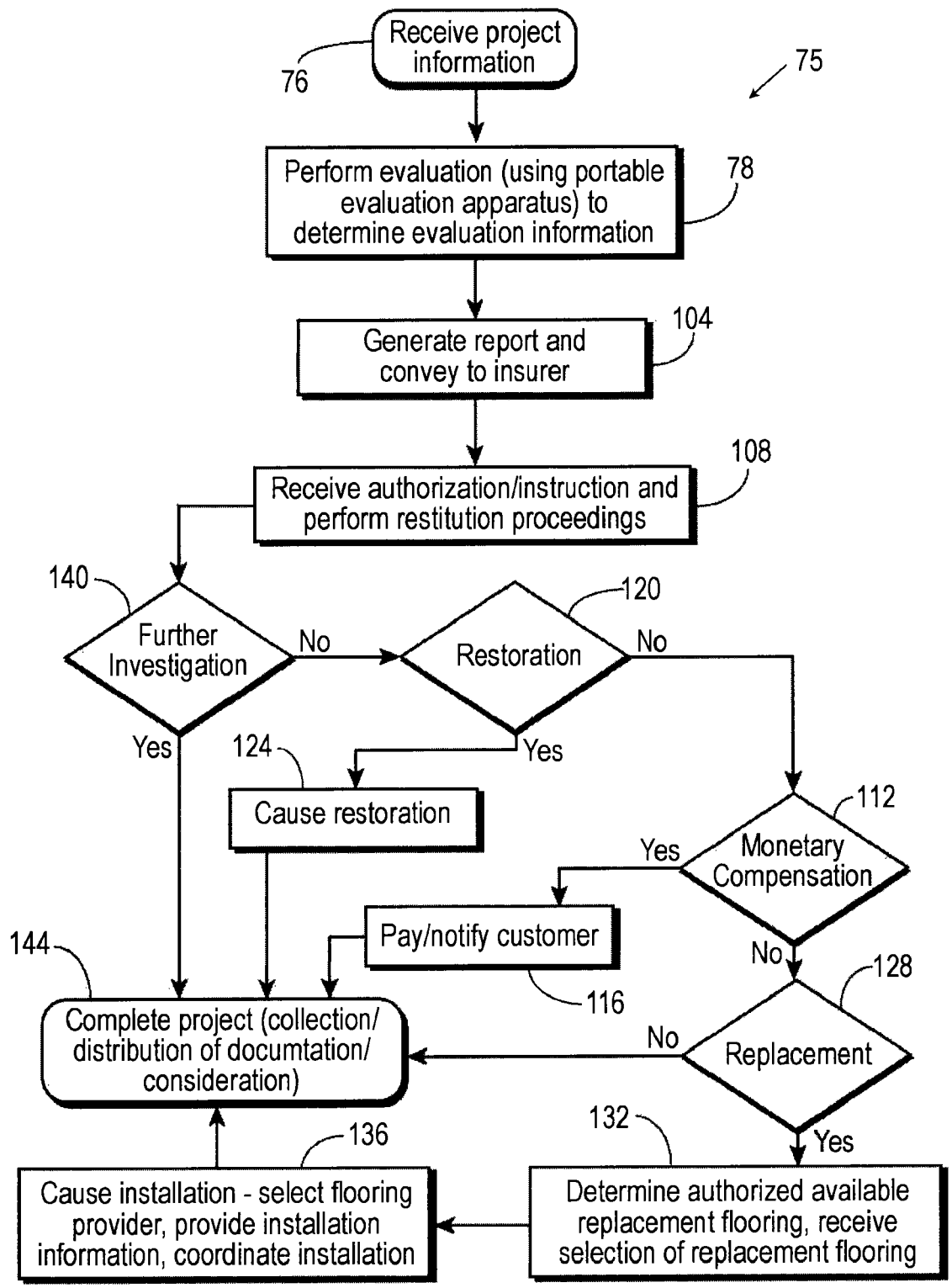

Referring now to FIG. 2b, shown therein is one embodiment of a logic flow diagram 75 for the furniture evaluator 18. Once the furniture evaluator 18 receives at least a portion of the project information (as indicated by a step 76), the furniture evaluator 18 performs the furniture evaluation of the specified article of furniture 32 to determine evaluation information indicative of quantitative and qualitative properties of the specified article of furniture 32 being evaluated by the furniture evaluator 18 (as indicated by a step 78). As shown in FIG. 2c, in one preferred embodiment, when performing the evaluation of the specified article of furniture 32 in the step 78, the furniture evaluator 18 determines at least one characteristic option for at least one characteristic of furniture which is indicative of a least a portion of the specified furniture (as indicated by a step 79), and at least one loss option for at least one loss factor of furniture which is indicative of at least a portion of the evaluated furniture (as indicated by a step 80).

The term "characteristics of furniture", as used herein, refers to a distinguishing trait, quality, or property of an article of furniture, which tends to identify or otherwise affect the market worth of the article of furniture 32. In general, characteristics of furniture relate to physical properties of furniture, such as for example the type or composition of materials an article of furniture is constructed from; material attributes such as wood, metal, teak, bamboo, engineered materials, and the like; textile attributes such as weave, thickness or quality; dimensions such as length, height, thickness, weight; and/or any other cost affecting association of an article furniture, such as whether the furniture is hand-made, regional availability, manufacture good will, and/or name brand, trademark, copyright, or patent status of an article of furniture. The characteristics of an article of furniture can also include other various qualities, such as waterproofing type, waterproofing layer thickness, stainproofing or soil retardant type, and stainproofing or soil retardant layer thickness. Other characteristics of an article of furniture may be specifically associated with a particular article of furniture. For example, if the furniture evaluated includes a chair having a textile covered seat, then characteristics of furniture associated with a textile covered seat may further include at least one of textile type, weave, thread count, amount of textile needed, and the like. If for example the furniture includes padding under the textile covered seat, then the characteristics of padding may further include at least one of a thickness, density, or amount. Other characteristics of furniture should be apparent to those of ordinary skill in the art.

For each characteristic of furniture, there is at least one characteristic option which qualifies or quantifies the characteristic of furniture. The term "characteristic option" as used herein is a definitive trait, quality, or property of furniture. The one or more characteristic options associated with a general characteristic of furniture may be generally defined by or related to an industry standard or availability in the industry. For example, with respect to tables, if the characteristic of furniture is wood type, then characteristic options for wood type could include for example oak, maple, ebony, cherry, pine, or if the characteristic of furniture is seat fabric, then the characteristic options for seat fabric covering could include for example cotton, wicker, leather and the like. However, a characteristic option for a characteristic of furniture may be an essentially unrestricted variable defined by a particular furniture being evaluated, such as for example, if the characteristic of furniture is decorative additions, then the characteristic option of decorative additions would be a variable defined by the evaluated furniture. Typically, more than one characteristic option will be associated with the specified article of furniture. Further, more than one characteristic of furniture can be associated with a characteristic option, such as for example when characteristics of furniture are grouped to more precisely define the trait, quality, or property of furniture, and characteristic options can be the same for different characteristics, or groups of characteristics, of furniture. For example, a characteristic option of 2 inches can quantify the thickness of a chair leg, the thickness of the arm support, and a characteristic option 2 inches can quantify the thickness of the seat.

The term "loss factors of furniture", as used herein, refers to elements, circumstances, or influences which tend to contribute to or produce loss or depreciation in quality condition and/or market worth of an article of furniture caused by use during the life of the furniture. For example, loss factors can include age or time in use, chipping, amount or level of staining of fabric, amount or level of stain fading, amount or level of fabric discoloration, wear indications, and/or tears, cuts, streaks, holes, or dents present. Other loss factors can be specifically associated with a particular article of furniture. For example, if the furniture evaluated includes wood, then the loss factors of wood may further include at least one of water staining, nicks and gouges, warping, color fading, or delamination of veneering (if present).

For each loss factor of furniture, there is at least one loss option which qualifies or quantifies the loss factor. The term "loss option" as used herein is a definitive, degradative element, circumstance, or influence of furniture. The one or more loss option associated with a loss factor of furniture may be generally defined by or related to an industry standard or to a subjective standard of an observer, such as the furniture evaluator 18. For example, if the loss factor is level of amount of nicks and gouges present, the loss options for the level or nicks and gouges can be low, medium, or high, wherein the loss options of low, medium, or high are derived from a subjective standard of the furniture evaluator 18, or can be evaluated from an objective percentage determination generally accepted in the industry. However, a loss option for a loss factor of furniture may be an essentially unrestricted variable defined by a particular article of furniture being evaluated. For example, if the loss factor of furniture is the age, then the loss option would be a variable defined by the evaluated furniture. Typically, more than one loss option will be associated with the specified article of furniture 32. Further, more than one loss factor of furniture can be associated with one loss option, such as for example when loss factors of furniture are grouped to more precisely define the degradative element, circumstance, or influence of furniture, and loss options can be the same for different loss factors, or groups of loss factors, of furniture.

When performing a furniture evaluation, the furniture evaluator 18 may utilize any method, process, technique, device, machine, or tool in determining the at least one characteristic option and/or the at least one loss option which is indicative of at least a portion of the specified article of furniture 32. Information indicative of any method, process, technique, device, machine, or tool utilized, including any measurements, data, results, records, pictures, or observations obtained through the utilization of any such method, process, technique, device, machine, or tool can be included as evaluation information.

In one preferred embodiment, the furniture evaluator 18 utilizes a portable evaluation apparatus which is utilized to evaluate the condition of the particular item of furniture. The portable evaluation apparatus can include at least one of a vehicle, a computer, a measuring device, a chemical kit, or any other equipment or materials which may aid in conducting measurements, experiments, and calculations regarding the particular article of furniture which may facilitate the furniture evaluation. For example, the portable evaluation apparatus can include at least one of a microscope, a digital or film camera, a laptop computer, hardware, software (e.g. measurement software or material recognition software), a scale, a ruler, a chemical, a container, a literary reference, a printer, paper, a scanner, or combinations thereof.

In one preferred embodiment the furniture evaluator 18 further utilizes evaluation logic in the performance of the furniture evaluation. The evaluation logic includes hardware, software, or combinations thereof. In one embodiment, the evaluation logic is software, which can be stored on a computer readable medium comprising at least one substrate. The evaluation logic can be utilized to record project information and to analyze, record, and/or make determinations of evaluation information, including at least one characteristic option and/or at least one loss option indicative of the specified article of furniture 32 being evaluated. Further, as mentioned above, the evaluation logic can be utilized in determining other evaluation information such as the current monetary market value and/or the devaluated monetary market value of the specified article of furniture 32.

As shown for example in FIGS. 3-9, in one preferred embodiment, the evaluation logic causes an output device, such as a computer, to provide one or more program modules or GUI's perceivable by a user, such as the furniture evaluator 18. The output device can accept user input provided by the furniture evaluator 18 via at least one input device, such as for example a keyboard, mouse, scanner, touch-screen, voice-recognition, or other similar devices, wherein the user input is accessible by the evaluation logic. The output device may further receive input from other devices which is accessible by the evaluation logic. Further, such input and/or output from the evaluation logic can be stored on a local and/or remote database, e.g. a database of a central processing unit of the output device, or a database of an Internet-accessible storage unit.

As shown in FIG. 3, the evaluation logic can provide a program module to the furniture evaluator 18 which has input fields wherein at least a portion of the project information and furniture evaluator information can be inputted and recorded. For example, as shown in FIG. 3, the furniture evaluator 18 can input a customer name and address, furniture site address, furniture type and location, cause of damage, insurer name, insurance policy number, and furniture evaluator name. Further, at least one of the input fields can be provided with data automatically by the evaluation logic, wherein the data is a default value or the data is retrieved from a database using, as a reference, input from one or more of the other input fields. For example, a customer name can be a reference from which an address associated with the customer name is retrieved and automatically entered into the address input field.

Figure 4:
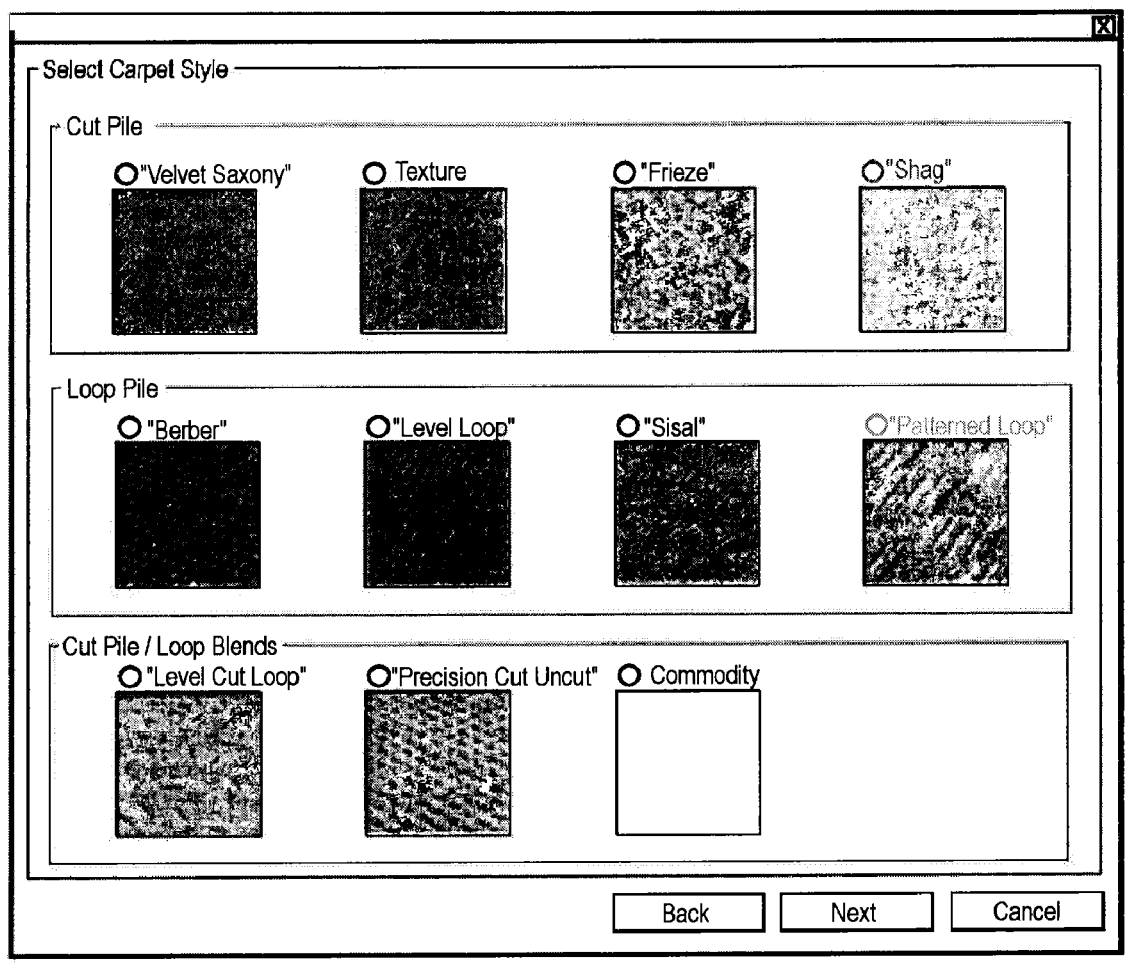
FIGS. 4 and 5 show embodiments of program modules for characteristic option input.
Figure 5:
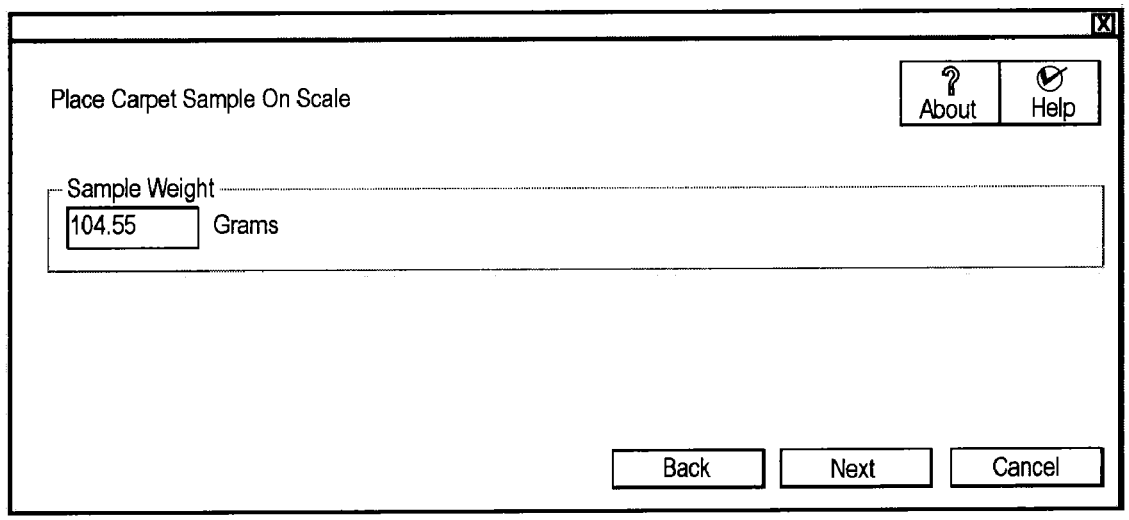

As shown in FIGS. 4-5, the evaluation logic can further cause the output device to selectively output a program module wherein input relating to characteristic options can be received so that a plurality of characteristic options indicative of the specified article of furniture 32 can be selected or defined thereby providing input to the evaluation logic. In one preferred embodiment, the evaluation logic causes the output device to selectively output a plurality of characteristic options for at least one characteristic of furniture so that at least one characteristic option indicative of the specified article of furniture 32 can be selected by the furniture evaluator 18, thus providing input indicative of the specified article of furniture 32 to the evaluation logic (as indicated by a step 81 in FIG. 2c). In such an embodiment, the plurality of characteristic options can be outputted in the form of predetermined input selections, wherein each characteristic option is represented by one or more of a button or dial, a pull-down or scroll menu, a slider, an image, or the like, from which at least one characteristic option indicative of the specified furniture 32 can be selected. For example, as shown in FIG. 4, if the characteristic of furniture is wood type, the evaluation logic can cause the output device to selective output a plurality of characteristic options for wood type, such as "Oak", "Cherry", "Maple", "Pine" and the like in the form of predetermined input selections represented by images and radial buttons from which the furniture evaluator 18 can select a wood type to provide input indicative of the specified article of furniture 32.

Further, in another embodiment, so that a plurality of characteristic options can be inputted in the step 81, the evaluation logic can cause the output device to output at least one input field wherein at least one characteristic option can be defined by user input, or by input from another local or remote program or device. For example, as shown in FIG. 5, if the characteristic of furniture is amount of wood used (per linear foot), the characteristic option of amount of wood used can be defined by input received from a furniture evaluator 18 conducting measurements of the article of furniture 32. Further, a characteristic option can be automatically defined by the evaluation logic, wherein the characteristic option is defined by a default value or by data automatically retrieved from a database using, as a reference, data relating to one or more previously selected or defined characteristic options.

After the evaluation logic has received input indicative of the plurality of characteristic options, the furniture evaluator 18 can further utilize the evaluation logic to calculate, automatically, the current monetary market value for at least a portion of the specified article of furniture 32 (as indicated by a step 83 in FIG. 2c). In one embodiment, to calculate the current monetary market value, each characteristic option selected or defined is assigned a weighted value in the evaluation logic which is indicative of a relational market worth associated with the characteristic option. The weighted value can be assigned to a selected or defined characteristic option in a predetermined manner using predetermined direct associations or a formula.

The evaluation logic utilizes the weighted value assigned to the characteristic options upon which input was received to calculate the current monetary market value for at least a portion of the specified article of furniture 32. In one embodiment, the calculation of the current monetary market value for at least a portion of the specified article of furniture 32 utilizes an aggregate of the weighted values assigned to each characteristic option upon which input was received to form a characteristic option score. In one embodiment, the weighted values assigned to each characteristic option upon which input was received are summed to form the characteristic option score. The characteristic option score is then scaled by a multiplier value to form the current monetary market value for at least a portion of the specified article of furniture 32. In another embodiment, the weighted value assigned to each characteristic option upon which input was received can further account for the multiplier value, and then such weighted values can be summed to form the current monetary market value for at least a portion of the specified article of furniture 32.

In one preferred embodiment, the multiplier value used to scale the characteristic option score is derived from an average aggregate correlation between the weighted value assigned to each characteristic option and market value. For example, the multiplier value can be derived by assessing a statistically significant and diverse sampling of current products associated with particular articles of furniture which are available in the market so as to determine correlations between particular characteristic options and/or characteristic option scores associated with the products and market pricing or value for the products. Thus, a generally average market value associated with particular characteristic options and/or characteristic option scores can be utilized to objectively convert the particular characteristic options and/or characteristic option scores into a monetary market worth. In another embodiment, the multiplier value can be a predetermined value which is subjectively defined.

Figure 6:
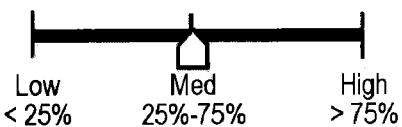
FIGS. 6 and 7 show embodiments of program modules for loss option input.
Figure 7:
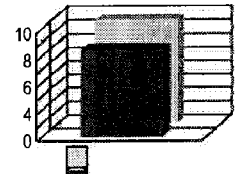

As shown in FIGS. 6-7, the evaluation logic can further cause the output device to selectively output a program module wherein input relating to loss options can be received so that a plurality of loss options indicative of the specified article of furniture 32 can be selected or defined thereby providing input to the evaluation logic. In one preferred embodiment, the evaluation logic causes the output device to selectively output a plurality of loss options for at least one loss factor of furniture so that at least one loss option indicative of the specified article of furniture 32 can be selected by the furniture evaluator 18, thus providing input indicative of the specified article of furniture 32 to the evaluation logic (as indicated by a step 82 in FIG. 2c). In such an embodiment, the plurality of loss options can be outputted in the form of predetermined input selections, wherein each loss option is represented by one or more of a button or dial, a pull-down or scroll menu, a slider, an image, or the like, from which at least one characteristic option indicative of the specified article of furniture 32 can be selected. For example, as shown in FIG. 6, if the loss factor of furniture is damage level, the evaluation logic can cause the output device to selectively output a plurality of characteristic options for damage level, such as "High", "Medium", and "Low", in the form of predetermined input selections represented by a slider, from which the furniture evaluator 18 can select damage level and provide input indicative of the specified article of furniture 32. Further, in another embodiment, so that the plurality of loss options can be inputted in the step 81, the evaluation logic can cause the output device to output at least one input field wherein at least one loss option can be defined by user input, or by input from another local or remote program or device. For example, as shown in FIG. 5, if the loss factor of furniture is age, the loss option for age can be defined by input received from the user. Further, a loss option can be automatically defined by the evaluation logic, wherein the loss option is defined by a default value or by data automatically retrieved from a database using, as a reference, data relating to one or more previously selected or defined loss options.

After the evaluation logic has received input indicative of a plurality of loss options, the furniture evaluator 18 can further utilize the evaluation logic to calculate, automatically, the devaluated monetary market value for at least a portion of the specified article of furniture 32 (as indicated by the step 83 in FIG. 2c). In one embodiment, each loss option selected or defined is assigned a weighted value in the evaluation logic which is indicative of a relational market loss associated with the loss option. The weighted value can be assigned to a selected or defined loss option in a predetermined manner using predetermined direct associations or a formula.

The evaluation logic utilizes the predetermined value assigned to each loss option upon which input was received to calculate the devaluated monetary market value for at least a portion of the specified article of furniture 32. Further, the evaluation logic utilizes a current monetary market value for at least a portion of the specified article of furniture in the calculation of the devaluated monetary market value for at least a portion of the specified article of furniture 32. The current monetary market value can be a value which is calculated utilizing the evaluation logic in accordance with the present invention, as discussed above, or can be otherwise provided to the evaluation logic, for example, through user input or input provided by another local or remote program or software, so long as the value is representative of a market worth for at least a portion of the evaluated furniture assuming the evaluated furniture is new condition, which can be for example a predetermined, actual, arbitrarily-defined, or assumed value.

In one embodiment, the calculation of the devaluated monetary market value for at least a portion of the specified article of furniture 32 utilizes an aggregate of the weighted values assigned to each loss option upon which input was received to form a loss option score. In one embodiment, the weighted values assigned to each loss option upon which input was received are summed to form the loss option score, which is then scaled by a multiplier value to form a loss percentage value which is then applied to the current monetary market value of the specified article of furniture 32 to determine the devaluated monetary market value of the specified article of furniture 32. The loss value may be limited by at least one of a predetermined minimum value or a predetermined maximum value. The loss value can be a percentage. In another embodiment, the weighted value assigned to each loss option upon which input was received can further account for the multiplier value, and then such weighted values can be summed to form the loss value.

In one preferred embodiment, the multiplier value used to scale the loss option score is derived from an average aggregate correlation between the assigned predetermined value of each loss option and market value loss. For example, the multiplier value may be derived by assessing a statistically significant and diverse sampling of industry association of particular loss options and/or loss option scores associated with a particular furniture and loss of value or worth. Thus, a generally average market loss associated with particular loss options and/or loss option scores can be utilized to objectively convert the particular loss options and/or loss option scores into a percentage or actual value of monetary market loss. In another embodiment, the multiplier value can be a predetermined value which is subjectively defined.

Once the evaluation logic has calculated the current monetary market value and/or devaluated monetary market value for at least a portion of the specified article of furniture 32, at least one of the calculated current monetary market value or devaluated monetary market value may be outputted by the evaluation logic in a manner perceivable by user, such as the furniture evaluator 18. For example, as shown in FIG. 7, the calculated current monetary market value and the devaluated monetary market value can be outputted in numerical and/or pictorial form to a program module displayed on a monitor and/or a printer of the output device.

Figure 8A:
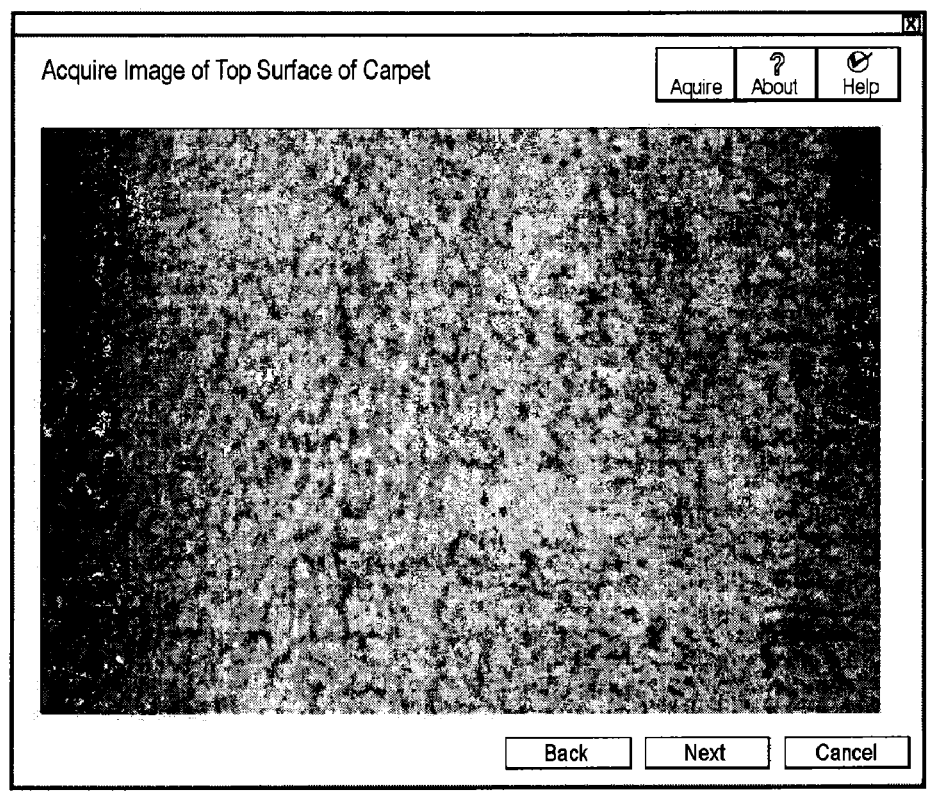
FIGS. 8a-e show embodiments of program modules for evaluation information input.
Figure 8B:
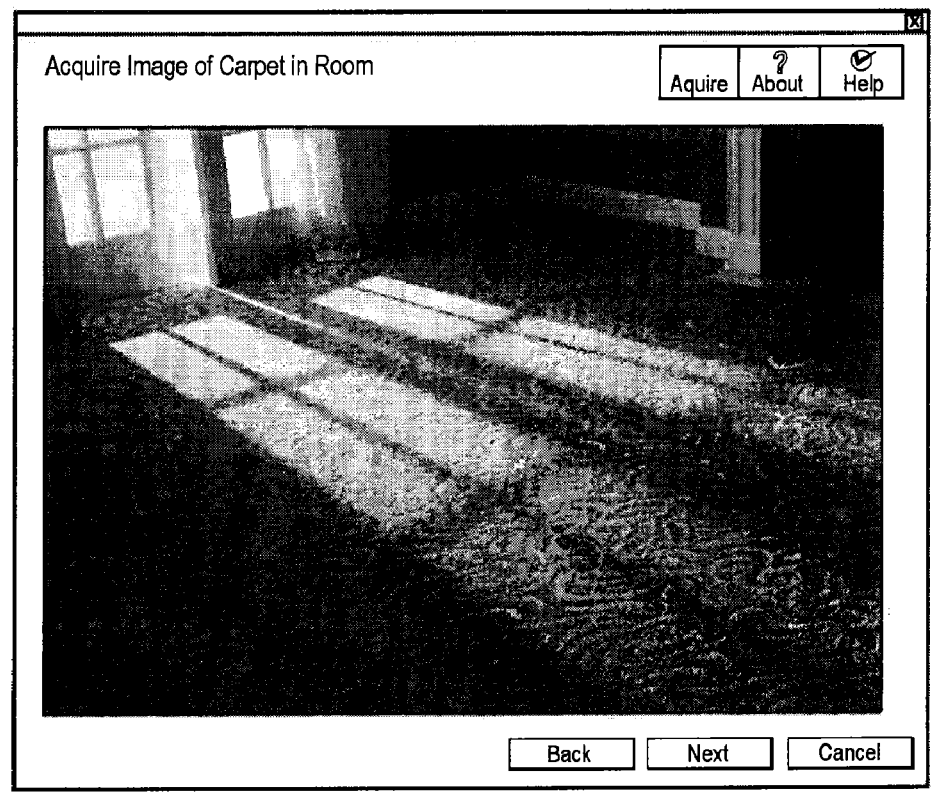
Figure 8C:
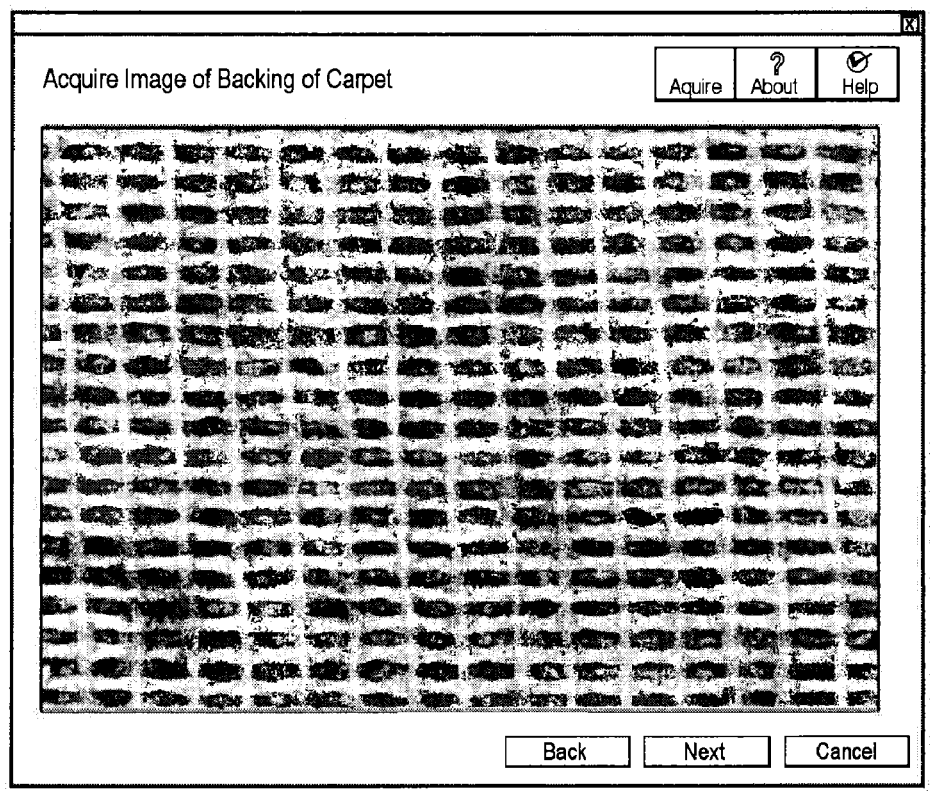
Figure 8D:
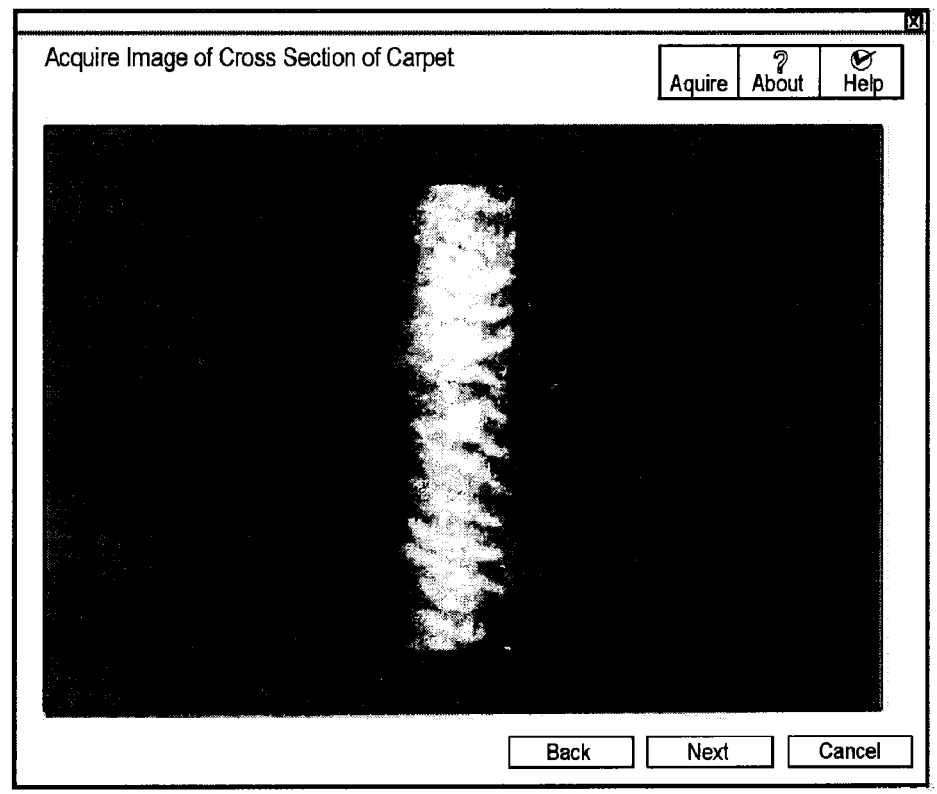
Figure 8E:
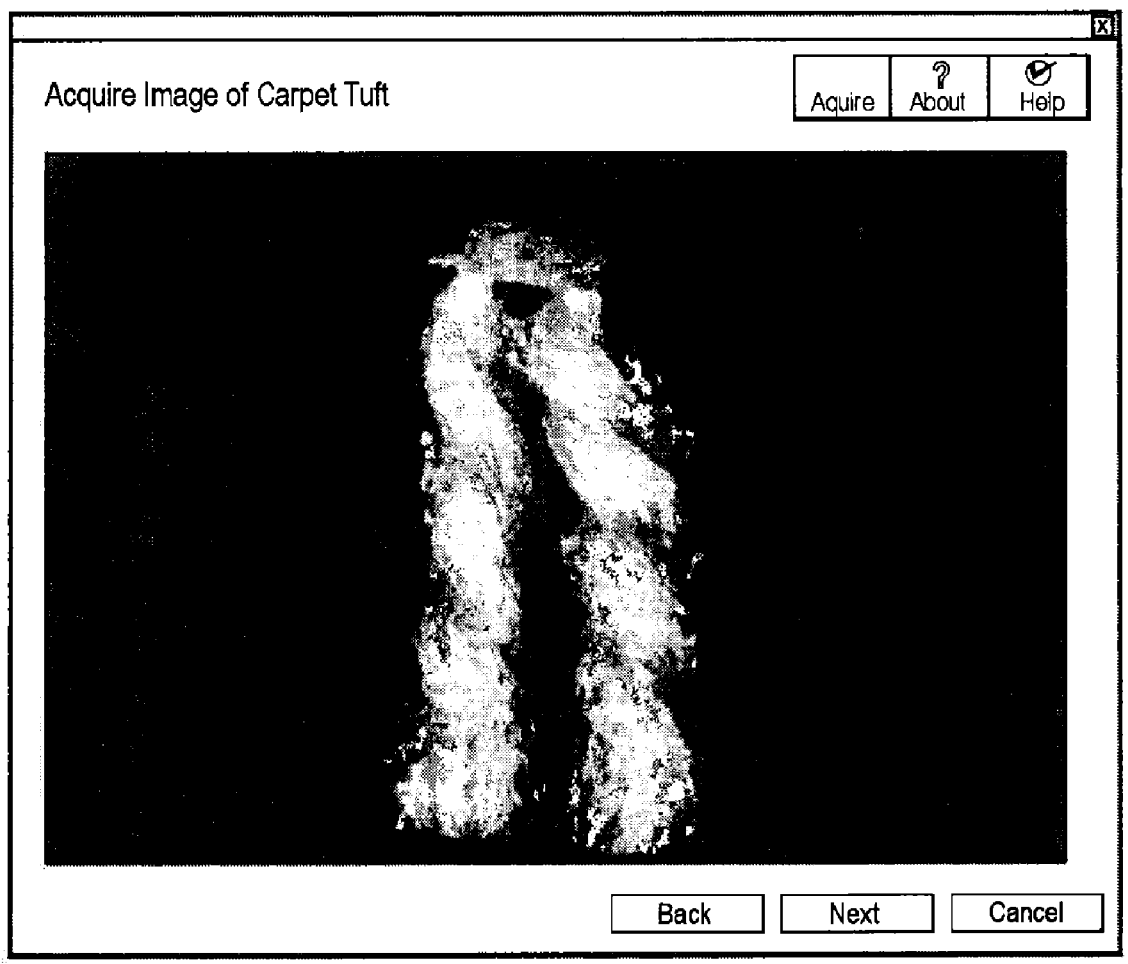

Further, the evaluation logic can also allow for input indicative of other information which the user, such as the furniture evaluator 18, wants to record. For example, the furniture evaluator 18 can input additional comments relating to the project in a comment input field, such as shown for example in FIG. 3. As another example, the furniture evaluator 18 can input digital images of at least a portion of the specified article of furniture 32, such as shown in FIG. 8*a-c*, wherein the specified article of furniture 32 is shown by way of example to include a chair with a cloth seat.

During the performance of the furniture evaluation, the furniture evaluator 18 may further convey at least a portion of the evaluation information to at least one of the customer 26, the insurer 22, or the dispatcher 18. For example, if at the on-site furniture evaluation, the furniture evaluator 18 is using digital images to make measurements or make records, the furniture evaluator 18 could show such digital images to the customer 26, for example on a monitor of a computer, and could also explain any techniques or process he may be applying and/or any conclusion or results determined by the furniture evaluator 18 or other device, such as a for example the computer. By conveying such evaluation information, the customer 26 may be assured that an objective evaluation is being performed.

Figure 9:
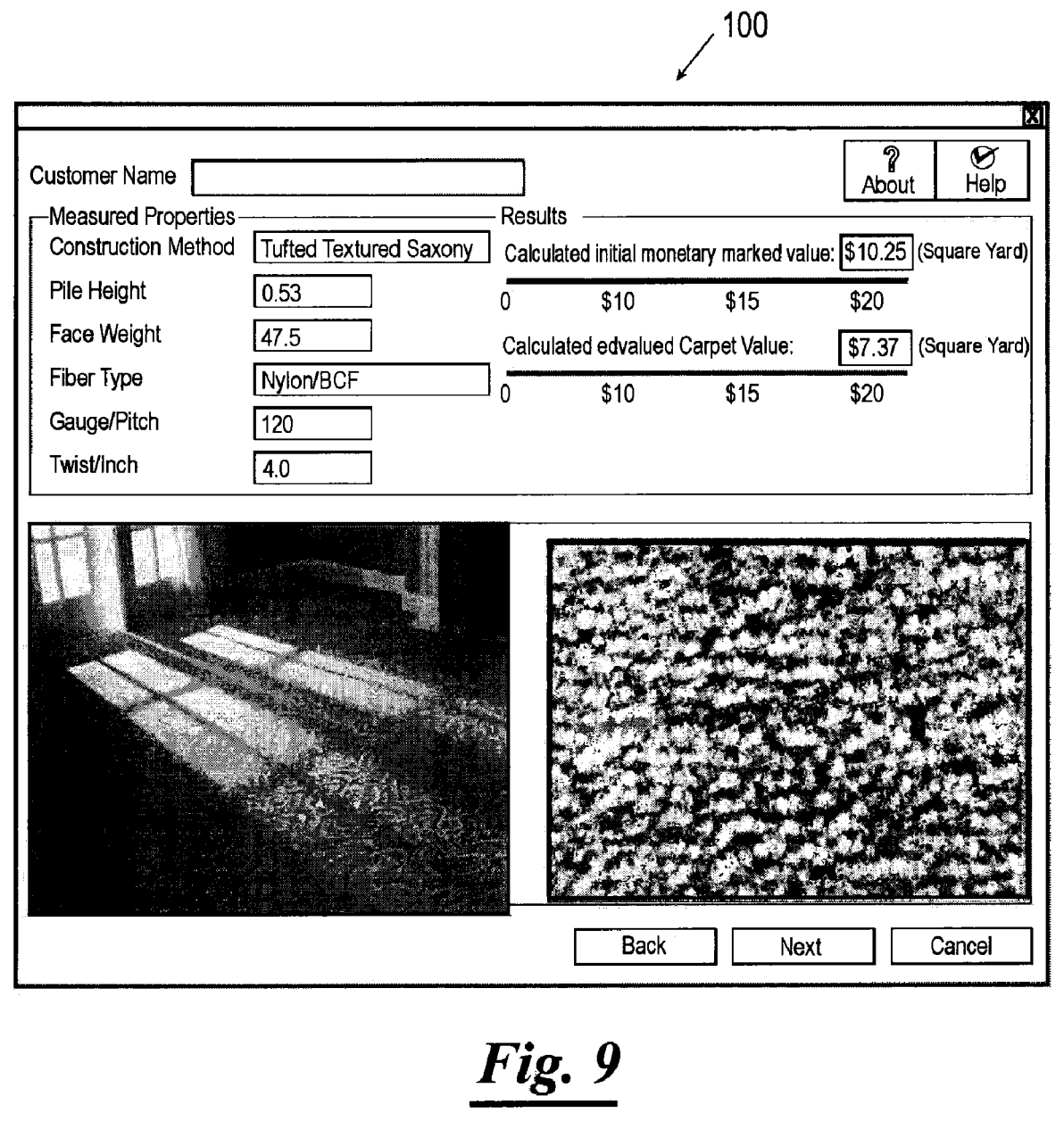

In one preferred embodiment, the evaluation logic causes the output device, such as the computer, to generate a report 100, such as shown for example in FIG. 9. The generated report 100 can be utilized to provide a digital record, such as for example a computer file, and/or physical record, such as for example a paper printout, of at least a portion of the evaluation information, project information, and/or any other information relating to the project for the specified article of furniture 32. The report 100 can be provided to at least one of the furniture evaluator 18, customer 26, insurer 22, or dispatcher 18, directly or indirectly, for example, where at least one of the furniture evaluator 18, insurer 22, customer 26, or dispatcher 14 which receives the report 100 can provide the report 100 to at least one of the furniture evaluator 18, insurer 22, customer 26, or dispatcher 14. For example, the furniture evaluator 18 can cause the output device, such as the computer, to output the report 100 to a printer so that it can be provided to the customer 26. In another example, the furniture evaluator 18 can cause the output device, such as the computer, to output the report 100 via the Internet, for example via an email, to a database and/or a computer of the insurer 22 and/or dispatcher 14.

In one preferred embodiment, as shown in FIG. 2*b*, the insurer 22 is provided the report 100 by the furniture evaluator 18 (as indicated by a step 104) via the communication channel 50 (see FIG. 1). For example, a printout of the report 100 or an email file containing the report 100, which may include digital photos of at least of a portion of the specified article of furniture 32, can be sent to a local agent or adjuster at a main office of the insurer 22. Once the insurer 22 receives the report 100, the insurer 22 reviews the evaluation information and/or project information recorded therein and can further convey to the furniture evaluator 18 authorization and/or instructions for restitution proceedings (as indicated by a step 108). The restitution proceedings may include providing monetary compensation to the customer 26 for damage to the specified article of furniture 32 (as indicated by steps 112 and 116). Further, the restitution proceedings may include restoring or replacing at least a portion of the specified article of furniture 32 (as indicated by steps 120 and 124, and steps 128, 132, and 136, respectively). The restitution proceedings may also include further investigation by the insurer 22 to determine whether monetary compensation, restoration, or replacement occurs (as indicated by step 140). Further, restitution proceedings may include collection and/or distribution of documentation (e.g. releases, receipts, replacement agreements), with any signatures or other confirmation that may be required, and/or receiving monetary consideration from the customer 26 and/or the insurer 22 (as indicated by a step 144). When the restitution proceedings include replacing at least a portion of the specified article of furniture 32, the restitution proceedings may further include delivery of replacement components or scheduling for repairs of the specified article of furniture 32 (as indicated by the step 136).

For example, in step 108, the insurer 22 could authorize a monetary compensation in an amount equal to the value of the devaluated monetary market value recorded in the report 100, or the devaluated monetary market value minus a deductible amount, and instruct the furniture evaluator 18 to, in step 116, dispense such monetary compensation, for example by writing a check backed by funds of the insurer 22, to the customer 26, or the insurer 22 could instruct the furniture evaluator 18 to, in step 116, notify the customer 26 of the authorization and that such monetary compensation will be dispensed to the customer 26 via postal mail or direct deposit into a bank determined by the customer 26. Further, the insurer 22 could instruct the furniture evaluator 18 to, in step 144, acquire a signature on a release form from the customer 26 and provide a copy of the release form to the customer 26. Alternatively, the insurer 22 may, in step 108, authorize the furniture evaluator 18 to cause replacement of the specified article of furniture 32, wherein the insurer 22 will be liable for a cost no greater than some limited value, such as for example the current monetary market value or devaluated monetary market value recorded in the report 100, or an amount determined by the insurer 22 or predetermined in the insurance policy. Further, the insurer 22 may, in step 108 or 132, authorize and/or instruct on the type or quality of replacement furniture. Moreover, in the step 132, the evaluation logic may include a replacement database that stores identification of varieties of furniture and matches the characteristic options with characteristics of furniture to automatically select a replacement article of furniture. Ordering information such as a SKU number or price can be stored in the replacement database and used to order the replacement furniture.

Although the present invention has been discussed herein above as the at least one furniture evaluator 18 receiving authorization and/or instructions for restitution proceedings from the insurer 22, it should be understood that the present invention also contemplates the furniture evaluator 18 receiving authorization and/or instructions for restitution proceedings from the insurer 18, the customer 26, the dispatcher 14, or combinations thereof. Further, the furniture evaluator 18 may also be provided with predetermined authorization and/or instructions for restitution proceedings, which may for example be specified in the insurance policy for the specified article of furniture 32 or specified initially in the project information by the insurer 22.

In one preferred embodiment, the furniture evaluator 18 receives authorization and/or instructions for restitution proceedings which includes delivery. For example, if the insurer 22 authorizes replacement of the specified article of furniture 32, then the insurer 22 and/or customer 26 can authorize the delivery of replacement furniture. Additionally, the insurer 22 may authorize for the removal and disposal of the damaged article of furniture being replaced. When the restitution proceedings include replacement of damaged furniture, the restitution proceedings further includes at least one of the customer 26 or the insurer 22 selecting replacement furniture from a plurality of authorized available replacement articles of furniture, wherein the selected replacement furniture will be delivered at the furniture site.

In general, each authorized available replacement article of furniture is furniture which is readily available or accessible in the market, and which falls within an authorized category or range of furniture defined by at least of available monetary funds expendable on replacement furniture (e.g. funds guaranteed by the insurer 22 and/or consideration from the customer 26), the specified article of furniture 32 being replaced, furniture product type and quality and/or delivery preferences specified by the customer 26 and/or insurer 22, general product availability in the market, or combinations thereof.

In one embodiment, the system 10 further includes a plurality of furniture providers 150, wherein each of the furniture providers 150 is capable of at least one of providing furniture or delivering furniture. For example, the plurality of furniture providers 150 can include at least one of a furniture retailer, a furniture transporter, a furniture supplier, a furniture manufacture. Further, each of the furniture providers 150 can be affiliated or independent of at least one of the furniture evaluators 18.

In one embodiment, the furniture evaluator 18 utilizes replacement information, including for example the available monetary funds expendable on replacement furniture and preferences of product type and quality specified by the customer 26 and/or insurer 22, to evaluate furniture provider information for at least one of the furniture providers 150 to determine the plurality of authorized available replacement articles of furniture. The furniture provider information includes information indicative of at least one of accessible stock or quantity of particular articles of furniture, location of particular articles of furniture, possible delivery dates for particular articles of furniture, pricing for particular articles of furniture, or combinations thereof. For example, a database may be provided which contains furniture provider information for at least one of the furniture providers 150 from which a search can be conducted for furniture falling within a predetermined category of furniture. The predetermined category of furniture can be for example defined by at least one of pricing range, one or more particular characteristics of furniture or particular characteristic options, or possible delivery dates.

Once the plurality of authorized available replacement articles of furniture are determined, at least one of the customer 26 or insurer 22 can select the replacement furniture from one of the plurality of authorized available replacement articles of furniture, wherein the selected replacement furniture will be delivered to the furniture site. In one embodiment, the customer 26 and/or insurer 22 is provided with samples or illustrations of at least a portion of each of the plurality of authorized available replacement articles of furniture so as to aid the customer 26 and/or insurer 22 in the selection of the replacement furniture from the plurality of authorized available replacement articles of furniture. For example, the furniture evaluator 18 can provide physical samples of various articles of furniture, which may include for example segments of wood with varying stain colors and various swatches of fabric, so as to demonstrate to the customer 26 and/or insurer 22 actual physical properties representative of those associated with at least of portion of each authorized available replacement articles of furniture. Further, the customer 26 and/or insurer 22 may be provided with pictorial or digital illustrations representatives of at least a portion of each authorized available replacement articles of furniture. For example, the furniture evaluator 18 could provide the customer 26 and/or insurer 22, using a computer having a monitor, with virtual representations of at least a portion of at least one authorized available replacement articles of furniture, and/or further with a virtual illustration of the furniture site with at least one authorized available replacement articles of furniture delivered, such as for example by altering a digital image of the furniture site with graphics editing or enhancement software.

Once the replacement furniture has been selected, the selected replacement furniture is delivered to the furniture site. In one preferred embodiment, at least one furniture provider 150 is selected to participate in the delivery of the selected replacement furniture by providing and/or delivering the selected replacement furniture. For example, the at least one furniture provider 150 may be a furniture retailer with the selected replacement furniture and manpower which can deliver the same, wherein the furniture retailer also assembles the selected replacement furniture at the furniture site. In another example, at least one furniture provider 150 selected may be a mill with the materials or products for the selected replacement furniture which can deliver the same to the furniture site or to a location of another furniture provider 150, such as a furniture assembler with manpower which can assemble the same, and then the furniture assembler can assemble the selected replacement furniture at the furniture site. The at least one furniture provider 150 which is selected to assemble the replacement furniture can be selected by at least one of the furniture evaluator 18, the customer 26, the insurer 22, or dispatcher 14, or can be selected through the association of the at least one furniture provider 150 with one of the authorized available replacement articles of furniture.

For each furniture provider 150 selected to participate in the assembly and/or delivery of replacement furniture, the furniture evaluation system 10 generally operates in the same manner, therefore, for purposes of clarity, the furniture evaluation system 10 will be discussed hereafter with reference to one furniture provider 150 which has been selected to participate in the assembly and/or deliver of the replacement furniture.

In one embodiment, after the replacement furniture is selected, at least one of the furniture evaluator 18, the customer 26, the insurer 22, or dispatcher 14, coordinates the delivery of the replacement furniture at the furniture site by conveying delivery information to the selected furniture provider 150 via communication channels 154, 158, 162, and 166, respectively. The delivery information includes information indicative of at least one of the selected replacement furniture, delivery scheduling, the furniture site, the customer 26, the insurer 22, or combinations thereof. Further, the delivery information can include instructions for receiving payment and/or for collecting and/or distributing documentation (e.g. releases, receipts, replacement agreements), with any signatures or other confirmation that may be required. In one preferred embodiment, the furniture evaluator 18 can convey delivery information which includes customer contact information, the insurer contact information, desired delivery date, and a description (e.g specifications or dimensions) of the selected replacement furniture and furniture site to the furniture provider 150 via communication channel 154.

The communication channels 154, 158, 162, and 166 may be any communication median capable of conveying and receiving information between the furniture provider 150, and the furniture evaluator 18, customer 26, insurer 22, and dispatcher 14, respectively, such as an analog or digital telephone line, cable, fiber-optic line, wireless or other electronic communication medium, human medium, and/or any newly developed communication medium for communication between the furniture provider 150, and the furniture evaluator 18, customer 26, insurer 22, and dispatcher 14, respectively.

Further, the delivery of the selected replacement furniture can be further coordinated by at least one of the furniture provider 150, the furniture evaluator 18, the customer 26, the insurer 22, or dispatcher 14, by scheduling and/or confirming delivery dates with the customer 26 and/or furniture provider 150. For example, at least a portion of the delivery information can be recorded in a local and/or remote database, for example via the Internet, from which at least one the furniture provider 150, the furniture evaluator 18, the customer 26, the insurer 22, or dispatcher 14 can access at least a portion of the delivery information and/or schedule and/or confirmed delivery dates, and record the same on the database.

Once the entire project is complete, i.e. after the performance of the evaluation of the specified article of furniture and/or restitution proceedings have concluded, completed project information for at least one project can be accumulated and recorded so that such information is retrievable and/or inputtable by at least one of the dispatcher 14, at least one furniture evaluator 18, at least one insurer 22, at least one customer 26, or at least one furniture provider 150. For example, the completed project information may be recorded in a local and/or remote database, for example via the Internet. For each specified article of furniture 32 evaluated and/or replacement furniture delivered which is associated with the at least one project, the completed project information may include at least a portion of the project information, evaluation information, restitution proceedings, delivery information, or combinations thereof. In one preferred embodiment, the insurer 22 accumulates the project information to run risk analysis studies on the project information. This helps the insurer 22 to more accurately determine costs and trends so that insurance premiums can be set more accurately. The project information can also be utilized to adjust the multiplier values.

EXAMPLE 1

FIG. 9 illustrates one example of the present invention for determining the current monetary market value and the devaluated monetary market value of the specified article of furniture 32, which by way of example but not by limitation, includes a chair having a cloth seat and is located at the home of the customer 26.

A customer request for a furniture evaluation for the specified article of furniture 32 is received by the dispatcher 14, which also gathers project information. The dispatcher 14 selects one furniture evaluator 18 to perform the furniture evaluation and provides the furniture evaluator 18 with the project information. The furniture evaluator 18 contacts the customer 26 to schedule an appointment for the furniture evaluator 18 to perform the furniture evaluation for the specified chair 32. The furniture evaluator 18 travels to the home of the customer 26 utilizing the portable lab, which includes the vehicle.

Upon arriving at the home of the customer 26, the furniture evaluator 18 performs the furniture evaluation to determine evaluation information for the specified chair 32. Typically, the furniture evaluator 18 will take generally macroscopic photographs of the chair utilizing a digital camera so as to record the general condition of the overall specified chair 32 (see FIGS. 8a-c). The furniture evaluator 18 then visually inspects the chair to determine the materials used in the construction of the chair noting the type of finish (e.g., glossy, dull, and the like), color of stain and/or paint, and type of wood. It will be understood that if the type of wood is not ascertainable from a visual inspection, the furniture evaluator 18 may remove a sample of material from an inconspicuous location on the chair for further analysis. The furniture evaluator 18 may make particular note of any visible indicia of higher quality construction methods for example dovetailing, manufacturer indicia, or the like, which may indicate a more expensive article of furniture. Additionally, the furniture evaluator 18 may also remove samples of fabric from a portion of the chair such as the seat or the back rest.

The furniture evaluator 18 takes the samples to the portable lab, where the furniture evaluator 18 utilizes various equipment and techniques to determine characteristic options for various characteristics of the specified chair 32 and loss options for various loss factors of the chair 32 which are applicable to the specified chair 32, and inputs the characteristic options and loss options into the evaluation logic, which includes software stored on a laptop computer, by selecting or defining the characteristic options and the loss options indicative of the specified chair 32 using the program modules selectively outputted by the laptop computer.

The type of wood can be determined from inspection, touch, chemical or other type of analysis. The furniture evaluator 18 can also use a digital microscope, camera, scanner or combination thereof to determine features of the furniture from samples taken from the specified chair 32. The digital microscope, camera, or scanner are preferably in communication with the laptop computer, and measurement software and furniture recognition software stored on the laptop computer can be used to measure, determine, and record information indicative of the characteristic options for the specified chair 32.

Such evaluation information, including digital images and input indicative of the characteristic options for the type of wood of the chair, are received by the evaluation logic, for example by user input from the furniture evaluator 18, or from devices in communication with the laptop, such as the microscope or scale, or from other software, which provide input receivable by the evaluation logic. The evaluation logic then calculates, automatically, the current monetary market value for the specified chair 32.

As shown in FIG. 9, the evaluation logic assigns the selected or defined characteristic options upon which input was received a weighted value which is indicative of a relational market worth associated with each characteristic option. The weighted value can be assigned to a selected characteristic option generally using predetermined direct associations defined in the evaluation logic. For example, as shown in the FIG. 10*a*, the characteristic options for wood type, fabric type, type and amount of veneering, stain color and/or finish, style elements and high style elements are assigned weighted values associated with each characteristic option. Further, the weighted value can be assigned to a defined characteristic option using a formula. For example, as shown in FIG. 10*a*, the characteristic option for solid oak wood and the characteristic option for leather seat fabric are weighted utilizing a formula which is dependent on the defined value received for the characteristic option. The evaluation logic forms the characteristic option score by summing the weighted value assigned to each characteristic option upon which input was received.

Further, the furniture evaluator 18 utilizes the various equipment and techniques to determine loss options for various loss factors of furniture for the specified article of furniture 32, and inputs the loss options into the evaluation logic by selecting or defining the loss option for each of the various loss factors of the specified chair 32 using the program modules selectively outputted by the laptop computer (see FIG. 10*b*). For example, the furniture evaluator can communicate with the customer 26 or refer to the project information to determine the age of the chair 32. The furniture evaluator 18 can also use the microscope and measurement software to measure and record information indicative of the loss options for the seat and/or other fabrics by analyzing the amount of damage to the wood and/or other items such as the seat fabric. Further, the furniture evaluator 18 can determine the loss of stain color uniformity of the chair in terms of none, high, medium and low by determining a ratio of areas within the total overall area of the specified chair 32 where the stain and/or finish is present, respectively, for example through subjective approximations or through the use of digital images and software stored on the laptop. Additionally, the furniture evaluator 18 can determine the amount of veneering delamination and/or loss by a visual inspection of the specified chair 32.

Such evaluation information, including digital images and input indicative of the loss options for the chair 32, are received by the evaluation logic, for example by user input from the furniture evaluator 18, or from devices in communication with the laptop, such as the microscope or scale, or from other software, which provide input receivable by the evaluation logic. The evaluation logic can then be utilize to calculate automatically the devaluated monetary market value for at least a portion of the chair 32, generally by reducing the calculated current monetary market value for at least a portion of the chair 32.

The evaluation logic then forms the loss value in terms of a percentage by summing the weighted value assigned to each characteristic option upon which input was received. The loss value is then applied to the calculated current monetary market value to determine an amount the calculated current monetary market value of the specified chair 32 is to be reduced thereby calculating the devaluated monetary market value of the chair 32.

The furniture provider 18 then generates the report 100 and emails a copy of the report 100 to a local agent of the insurer 22. The local agent reviews the report 100 and then authorizes and instructs the furniture provider 18 that replacement furniture should be delivered and the insurer 22 will guarantee funds in an amount equal to the calculated devaluated monetary market value for the specified article of furniture 32. The furniture provider 18 communicates to the customer and further determines any monetary consideration the customer will provide for replacement furniture. Based on the available monetary funds expendable on replacement furniture that is desired by the customer 26, the furniture evaluator 18 determines a plurality of authorized available replacement furniture providers by searching databases of furniture provider information. Samples representative of the plurality of authorized available replacement articles of furniture are shown to the customer to aid in the selection of the replacement furniture. Once the customer 26 selects one of the plurality of authorized available replacement articles of furniture as the replacement furniture, the furniture evaluator 18 orders the furniture from the furniture provider 150 associated with the selected authorized available replacement articles of furniture and causes the replacement furniture to be delivered on a date mutually agreeable by the customer 26 and the furniture provider 150.

In another embodiment, the local agent reviews the report 100 and then authorizes and instructs the furniture provider 18 that a remediation and/or repair of the specified furniture 32 should take place and the insurer 22 will guarantee funds in an amount equal to the calculated devaluated monetary market value for the specified article of furniture 32. The furniture provider 18 communicates to the customer and further determines any monetary consideration the customer will provide for remediation and/or repair of the furniture. Based on the available monetary funds expendable on remediation and/or repair of the furniture that is desired by the customer 26, the furniture evaluator 18 determines a plurality of authorized furniture remediators by searching databases of furniture provider information. Once the customer 26 selects one of the plurality of authorized furniture remediators, the furniture evaluator 18 orders one of the authorized furniture remediators to be remediate and/or repair the specified furniture 32 on a date mutually agreeable by the customer 26 and the furniture remediator.

The embodiments of the invention discussed herein are intended to be illustrative and not limiting. Other embodiments of the invention will be obvious to those skilled in the art in view of the above disclosure and appended claims. Changes may be made in the embodiments of the invention described herein, or in the parts or the elements of the embodiments described herein, or in the steps or sequence of steps of the methods described herein, without departing from the spirit and/or the scope of the invention.

What is claimed is:

1. A dispatch system for evaluation of an article of furniture, comprising:
    a plurality of furniture evaluators, wherein each furniture evaluator includes evaluation logic and a portable evaluation apparatus to perform an evaluation of the article furniture so as to determine evaluation information selected from a group comprising a characteristic option, a loss option, a current monetary market value, a devaluated monetary market value, or combinations thereof; and a dispatcher computer system comprising at least a computer and a memory for receiving project information indicative of at least one of a specified article of furniture, a customer for the specified article of furniture, an insurer for the specified article of furniture, a furniture site for the specified article of furniture, an insurance coverage for the specified article of furniture, or combinations thereof, wherein the dispatcher computer system utilizes the project information received to select at least one appropriate furniture evaluator from the plurality of furniture evaluators to perform a furniture evaluation of the specified article of furniture, and provides at least a portion of the project information to the at least one selected furniture evaluator wherein the at least one selected furniture evaluator further receives at least one of authorization or instructions for restitution proceedings, wherein the restitution proceedings includes providing at least one of monetary compensation for damage to the specified article of furniture, restoring at least a portion of the specified article of furniture, or replacing at least a portion of the specified article of furniture.

2. The dispatch system of claim 1, wherein the furniture evaluator further provides the evaluation information to at least one of the customer, the insurer, or the dispatcher.

3. The dispatch system of claim 1, wherein replacing the specified article of furniture includes at least one of the customer or the insurer selecting a replacement article of furniture from a plurality of authorized available replacement articles of furniture wherein the selected replacement article of furniture is delivered to the furniture site.

4. The dispatch system of claim 1, further comprising a furniture provider, wherein the furniture provider delivers the selected replacement article of furniture to the furniture site.

* * * * *